(12) United States Patent
Nakamura

(10) Patent No.: US 8,803,447 B2
(45) Date of Patent: Aug. 12, 2014

(54) LIGHT SOURCE CONTROL DEVICE AND LIGHT SOURCE CONTROL METHOD

(71) Applicant: Minebea Co., Ltd., Nagano (JP)

(72) Inventor: Yoshihiro Nakamura, Fukuroi (JP)

(73) Assignee: Minebea Co., Ltd., Nagano (JP)

( * ) Notice: Subject to any disclaimer, the term of this patent is extended or adjusted under 35 U.S.C. 154(b) by 119 days.

(21) Appl. No.: 13/714,661

(22) Filed: Dec. 14, 2012

(65) Prior Publication Data

US 2013/0169184 A1 Jul. 4, 2013

(30) Foreign Application Priority Data

Dec. 28, 2011 (JP) ................. 2011-287410

(51) Int. Cl.
*H05B 37/02* (2006.01)
*H05B 41/392* (2006.01)

(52) U.S. Cl.
CPC ............ *H05B 37/02* (2013.01); *H05B 41/3928* (2013.01); *Y02B 20/202* (2013.01)
USPC ........... 315/307; 315/308; 315/291; 315/287; 315/224; 315/247; 353/85; 348/744

(58) Field of Classification Search
CPC .............. H05B 33/0815; H05B 33/02; H05B 33/0851; H05B 41/28; H05B 41/3927; H05B 41/2855; H05B 41/2928; H05B 41/3925; H05B 37/0281; G09G 2320/0646; G09G 2320/0653; G09G 3/3406; H04N 9/315; H04N 9/3179
USPC ......... 315/307, 308, 291, 287, 225, 247, 244, 315/209 R, 246, 224; 348/744, 714, 760; 353/31, 34, 39, 85
See application file for complete search history.

(56) References Cited

U.S. PATENT DOCUMENTS

| | | | | |
|---|---|---|---|---|
| 6,791,286 B2 * | 9/2004 | Matsumoto | .................... | 315/308 |
| 7,256,841 B2 * | 8/2007 | Hibi et al. | ...................... | 348/750 |
| 8,264,170 B2 * | 9/2012 | Terashima et al. | ............. | 315/308 |
| 8,342,695 B2 * | 1/2013 | Hirao et al. | ..................... | 353/85 |
| 8,493,288 B2 * | 7/2013 | Dickinson | ........................ | 345/32 |

FOREIGN PATENT DOCUMENTS

| | | |
|---|---|---|
| JP | 2007-242421 A | 9/2007 |
| JP | 2010-266607 A | 11/2010 |

* cited by examiner

*Primary Examiner* — Haiss Philogene
(74) *Attorney, Agent, or Firm* — Carrier Blackman & Associates, P.C.; Joseph P. Carrier; William D. Blackman

(57) ABSTRACT

A light source control device controlling a light source that emits light corresponding to supplied current and a color wheel having a plurality of color segments that converts the light emitted from the light source, the light source control device includes: a current generation circuit, which supplies current to the light source, based on a control signal for controlling an amount of the light of the light source; and a control circuit unit, which stores a plurality of modulation factors corresponding to the plurality of color segments and has a plurality of calculation units corresponding to the plurality of color segments, and which operates the calculation unit corresponding to the segment in synchronization with each segment to thus calculate control information of the control signal.

6 Claims, 9 Drawing Sheets

- CONFIGURATION FIRST ILLUSTRATIVE EMBODIMENT -

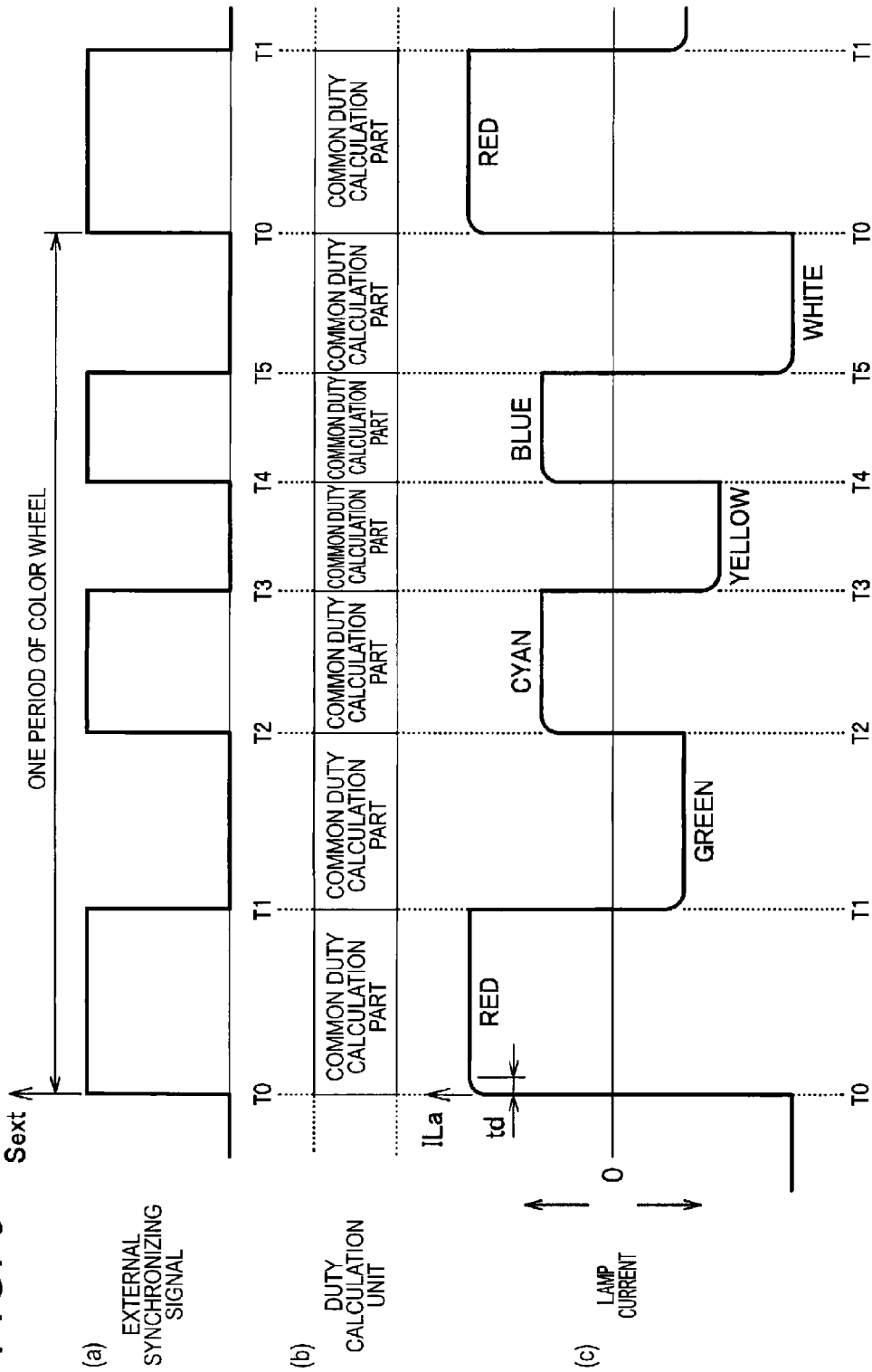

LIGHT SOURCE CONTROL DEVICE AND LIGHT SOURCE CONTROL METHOD

CROSS-REFERENCE TO RELATED APPLICATION

This application claims priority from Japanese Patent Application No. 2011-287410 filed on Dec. 28, 2011, the entire subject matter of which is incorporated herein by reference.

TECHNICAL FIELD

This disclosure relates to a light source control device and a light source control method, in which light emitted from a light source is converted through a color wheel having a plurality of color segments.

BACK GROUND

In recent years, a projector adopting a DLP (Digital Light Processing) method has been spread in markets. For the projector, it is needed to improve a variety of characteristics, such as further improvement on brightness and miniaturization.

Most of the projectors adopting the DLP method have a lighting device (light source control device) of an electric discharge lamp having a DC-DC converter circuit and a DC-AC inverter circuit. The DC-DC converter circuit converts a direct current (DC) voltage, which is supplied from the outside, into a DC voltage appropriate for driving of the electric discharge lamp so as to perform constant current control or constant power control for the electric discharge lamp. The DC-AC inverter circuit converts the DC voltage generated by the DC-DC converter circuit into an alternating current (AC) voltage and supplies the same to the electric discharge lamp as a driving voltage.

The projector has a color wheel having a plurality of color segments (color areas), as a color separation device (color filter) of a time division type, and synchronizes current (polarity reversion) timing of lamp current flowing in the electric discharge lamp with rotation of the color wheel. Accordingly, the light that is emitted from the electric discharge lamp is converted into lights of the plurality of colors through the color wheel having the plurality of color segments.

JP-A-2007-242421 discloses a high-pressure electric discharge lamp lighting device that reverses a polarity of a voltage to be applied to a high voltage electric discharge lamp every synchronizing signal. In JP-A-2007-242421, a polarity of lamp current is reversed in synchronization with timing at which a segment of the color wheel is switched, thereby increasing or decreasing the lamp current for each segment. JP-A-2007-242421 discloses that such control has an effect of improving color reproduction of an image to be projected.

JP-A-2010-266607 discloses a high-pressure electric discharge lamp lighting device that adjusts polarity reversion timing of AC lamp current, based on a detected rotation speed of a color wheel. JP-A-2010-266607 discloses that control of synchronizing the polarity reversion timing of the lamp current, at which a light output of the electric discharge lamp is decreased with timing and each segment of the color wheel is switched, has an effect of suppressing deterioration of an illumination intensity efficiency.

SUMMARY

According to the projectors having the color wheel disclosed in JP-A-2007-242421 and JP-A-2010-266607, a single control circuit executes a single control loop. Therefore, according to the projectors disclosed in JP-A-2007-242421 and JP-A-2010-266607, upon controlling an amount of luminescence (light modulation factor) of a light source of each segment, if the amount of luminescence is remarkably varied, it takes time to switch a duty ratio of a switching pulse of a switching device of the DC-DC converter circuit and the increase in the lamp current is delayed, so that the amount of luminescence of the electric discharge lamp may not reach a target. Accordingly, an image projected by the projector becomes dark instantaneously.

The projectors disclosed in JP-A-2007-242421 and JP-A-2010-266607 perform the polarity reversion of the lamp current in synchronization with the timing at which the segment of the color wheel is switched. The influence of the delay of the increase in the lamp current is remarkable in case that the lamp current to be supplied to the electric discharge lamp is increased. As a result, a quality of an image to be projected is deteriorated.

In view of the above, a projector may be configured to instantaneously increase or decrease a control gain of the amount of luminescence around the timing at which the segment of the color wheel is switched. However, according to the method of instantaneously increasing or decreasing the control gain, it is difficult to perform the adjustment. Also, when the adjustment is not appropriately performed, the control on the amount of luminescence in the projector becomes unstable, so that a quality of an image to be projected may be deteriorated.

Accordingly, this disclosure is provided to stably control an amount of light to be emitted from a light source when converting the light emitted from the light source through a color wheel having a plurality of color segments.

In view of the above, this disclosure is configured as follows. A light source control device controls a light source that emits light corresponding to supplied current and a color wheel having a plurality of color segments that converts the light emitted from the light source, and the light source control device includes: a current generation circuit, which supplies current to the light source, based on a control signal for controlling an amount of the light of the light source; and a control circuit unit, which stores a plurality of modulation factors corresponding to the plurality of color segments and has a plurality of calculation units corresponding to the plurality of color segments, and which operates the calculation unit corresponding to the segment in synchronization with each segment to thus calculate control information of the control signal.

The other configurations will be described in illustrative embodiments of this disclosure.

According to this disclosure, it is possible to stably control the amount of light to be emitted from the light source when converting the light emitted from the light source at the color wheel having a plurality of color segments.

BRIEF DESCRIPTION OF THE DRAWINGS

The foregoing and additional features and characteristics of this disclosure will become more apparent from the following detailed descriptions considered with the reference to the accompanying drawings, wherein:

FIG. 4 is a flowchart illustrating calculation processing in the first illustrative embodiment, in which FIG. 4(a) illustrates whole processing of the calculation circuit and FIG. 4(b) illustrates processing of each duty calculation part;

FIG. 5 illustrates operations of respective units of the light source control device in the first illustrative embodiment, in which FIG. 5(a) illustrates a voltage waveform of an external synchronizing signal, FIG. 5(b) illustrates an operation of a duty calculation unit and FIG. 5(c) illustrates a waveform of lamp current;

FIG. 7 illustrates operations of respective units of the light source control device in the second illustrative embodiment, in which FIG. 7(a) illustrates a voltage waveform of an external synchronizing signal, FIG. 7(b) illustrates an operation of a duty calculation unit and FIG. 7(c) illustrates a waveform of lamp current;

FIG. 9 illustrates operations of respective units of a light source control device in the comparative example, in which FIG. 9(a) illustrates a voltage waveform of an external synchronizing signal, FIG. 9(b) illustrates an operation of a duty calculation unit and FIG. 9(c) illustrates a waveform of lamp current.

DETAILED DESCRIPTION

Hereinafter, illustrative embodiments of this disclosure will be described with reference to the respective drawings.

(Configuration of Light Source Control Device 1 of First Illustrative Embodiment)

Figure 1:
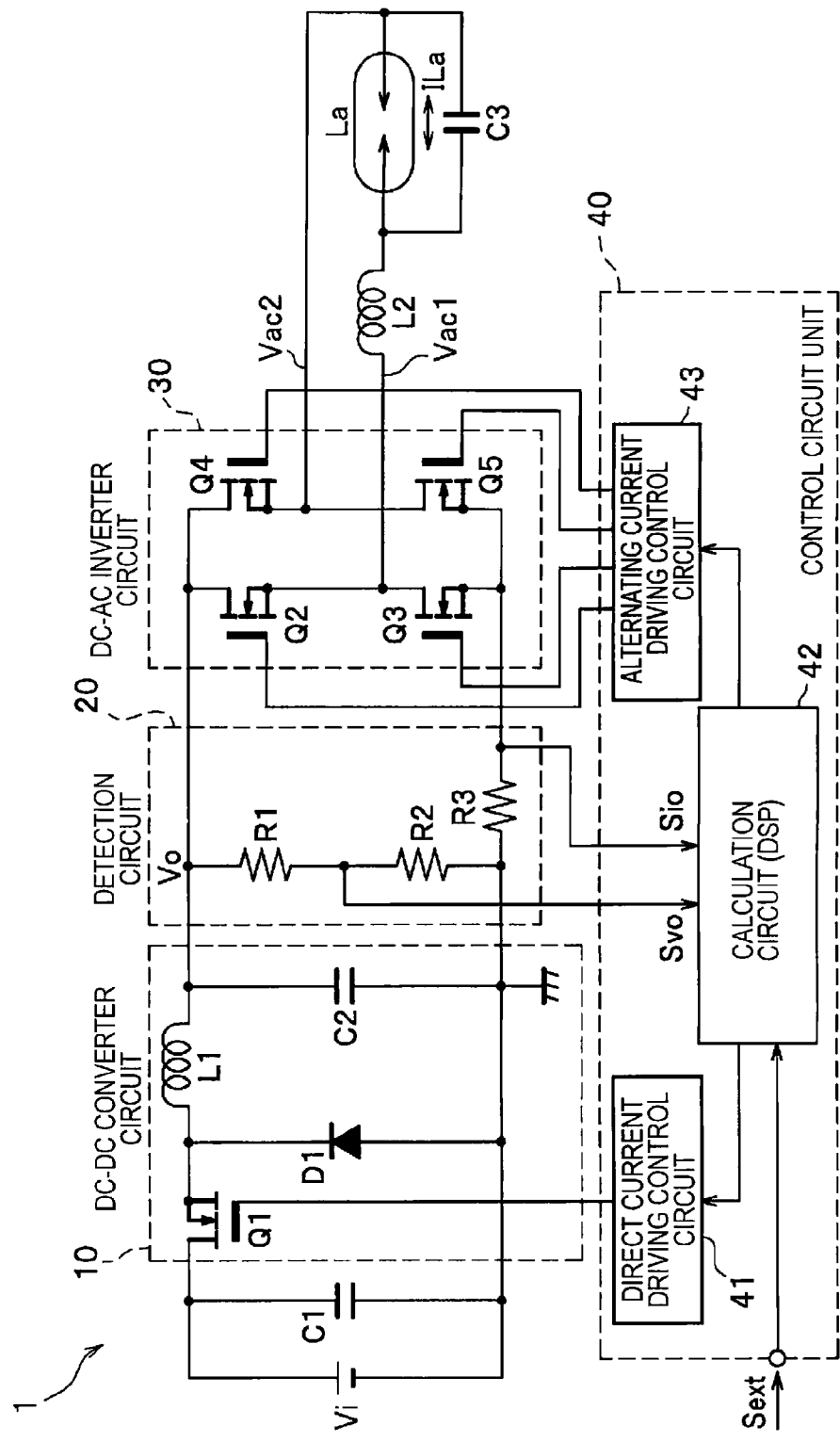
FIG. 1 is a view illustrating a schematic configuration of a light source control device in a first illustrative embodiment.

A light source control device 1 is described with reference to FIG. 1.

The light source control device 1 has a direct current (DC) power supply Vi, a smoothing capacitor C1, a DC-DC converter circuit 10, a detection circuit 20, a DC-AC inverter circuit 30, a coil L2, an electric discharge lamp (light source) La, a capacitor C3 and a control circuit unit 40.

The DC power supply Vi is a power supply that outputs a DC voltage V1 between a positive output terminal and a negative output terminal so as to feed power. The positive output terminal of the DC power supply Vi is connected to one end of the smoothing capacitor C1 and a positive input terminal of the DC-DC converter circuit 10. The negative output terminal of the DC power supply Vi is connected to the other end of the smoothing capacitor C1 and a negative input terminal of the DC-DC converter circuit 10. The DC power supply Vi applies the DC voltage V1 to the positive output terminal.

Here, the smoothing capacitor C1 can appropriately select whether or not a polarity or a type of the polarity, depending on a design specification of the light source control device 1.

The DC voltage V1 output by the DC power supply Vi is smoothed by the smoothing capacitor C1, and then it is applied to the DC-DC converter circuit 10. The DC voltage V1 applied to the DC-DC converter circuit 10 is converted into a DC voltage V0, and then it is applied to the DC-AC inverter circuit 30. The DC voltage V0 applied to the DC-AC inverter circuit 30 is converted into an alternating current (AC) voltage, and then it is supplied to the electric discharge lamp La that is a light source.

The DC-DC convert circuit 10, the detection circuit 20 and the DC-AC inverter circuit 30 configure a current generation circuit that supplies lamp current ILa based on a PWM (Pulse Width Modulation) signal to the electric discharge lamp La that is a light source.

<DC-DC Converter Circuit 10>

The DC-DC converter circuit 10 (DC voltage generation circuit) has a switching device Q1 that is an n-type MOSFET (Metal-Oxide-Semiconductor Field Effect Transistor), a free-wheeling diode D1, a choke coil L1 and a smoothing capacitor C2.

The DC-DC converter circuit 10 is a step-down chopper type power supply circuit. The voltage V1 input by the DC power supply Vi is applied between the positive input terminal and negative input terminal of the DC-DC converter circuit 10. Also, when a control signal is input from a DC driving control circuit 41 that will be described later, the DC voltage V0 corresponding to control information of the input control signal is output between the positive output terminal and negative output terminal of the DC-DC converter circuit 10. Meanwhile, in the DC-DC converter 10, both the negative input terminal and the negative output terminal are grounds.

Here, the control signal is a PWM signal and the control information is a duty ratio. That is, the DC-DC converter circuit 10 outputs the DC voltage V0 in response to the duty ratio of the input PWM signal.

A drain terminal of the switching device Q1 is the positive input terminal of the DC-DC converter circuit 10. A gate terminal of the switch terminal Q1 is connected to a DC driving control circuit 41 that will be described later. A source terminal of the switching device Q1 is connected to one end of the choke coil L1 and a cathode terminal of the free-wheeling diode D1. The switching device Q1 is on/off-controlled by a switching pulse, which is a control signal and is pulse width-modulated.

The cathode terminal of the free-wheeling diode D1 is connected to the source terminal of the switching device Q1 and one end of the choke coil L1. An anode terminal of the free-wheeling diode D1 is connected to a ground. When the switching device Q1 is off, the free-wheeling diode D1 supplies (flows back) the current from the ground to the choke coil L1.

The choke coil L1 has one end that is connected to the source terminal of the switching device Q1 and the cathode terminal of the free-wheeling diode D1. The other end of the choke coil L1 is connected to one end of the smoothing capacitor C2. The other end of the choke coil L1 is also the positive output terminal of the DC-DC converter circuit 10. The choke coil L1 repeats accumulation and discharge of electromagnetic energy as the input voltage V1 is applied to the one end thereof through the switching device Q1.

One end of the smoothing capacitor C2 is connected to the other end of the choke coil L1. The other end of the smoothing capacitor C2 is connected to the ground. The one end of the smoothing capacitor C2 is also the positive output terminal of the DC-DC converter circuit 10. The smoothing capacitor C2 is to smooth the output voltage V0 of the DC-DC converter circuit 10.

In the meantime, the smoothing capacitor C2 can appropriately select whether or not a polarity or a type of the polarity, depending on a design specification of the DC-DC converter circuit 10.

The DC voltage V1 is applied to the input terminal of the DC-DC converter circuit 10. The control signal that is input to the DC-DC converter circuit 10 is a PWM signal that is pulse width-modulated. The PWM signal is input to the gate terminal of the switching device Q1 to thus turn on/off the switching device Q1.

During an on-duty period of the PWM signal, the switching device Q1 becomes on. When the switching device Q1 becomes on, the current flows in the choke coil L1 and also in the positive output terminal of the DC-DC converter circuit 10. At this time, the choke coil L1 accumulates the electromagnetic energy. The current flowing through the other end of the choke coil L1 is gradually increased.

During an off-duty period of the PWM signal, the switching device Q1 becomes off. When the switching device Q1 becomes off, the choke coil L1 discharges the accumulated electromagnetic energy from the other end of the choke coil L1. Accompanied by this, the free-wheeling diode D1 enables the current to flow from the ground to the one end of the choke coil L1. The current flowing through the other end of the choke coil L1 is gradually decreased.

The DC voltage V0 output by the DC-DC converter circuit 10 is a voltage that is obtained as a voltage generated by current flowing through the other end of the choke coil L1 is smoothed by the smoothing capacitor C2. The DC voltage V0 corresponds to the duty ratio of the PWM signal. That is, the DC-DC converter circuit 10 converts the DC voltage V1 into the DC voltage V0 corresponding to the duty ratio of the PWM signal, and output the same to the detection circuit 20 through the other end of the choke coil L1.
Meanwhile, in the specification and drawings, the duty is also described as 'DUTY.'

<Detection Circuit 20>
A positive input terminal of the detection circuit 20 is connected to the positive output terminal of the DC-DC converter circuit 10. A negative input terminal of the detection circuit 20 is connected to the ground and to the negative output terminal of the DC-DC converter circuit 10.

A positive output terminal of the detection circuit 20 is connected to a positive input terminal of the DC-AC inverter circuit 30. An negative output terminal of the detection circuit 20 is connected to a negative input terminal of the DC-AC inverter circuit 30.

The detection circuit 20 has resistances R1 to R3. One end of the resistance R1 is connected to the positive output terminal and positive input terminal of the detection circuit 20. The other end of the resistance R1 is connected to one end of the resistance R2 and to an output terminal of a voltage Svo. The other end of the resistance R2 is connected to the ground and the negative input terminal. One end of the resistance R3 is connected to the negative output terminal of the detection circuit 20 and to an output terminal of a voltage Sio. The other end of the resistance R3 is connected to the ground and the negative input terminal.

The detection circuit 20 detects the voltage Svo, which indicates (is proportional to) the DC voltage V0 applied to the positive output terminal, and the voltage Sio, which indicates (is proportional to) the DC current flowing in the positive output terminal of the detection circuit 20.

The resistances R1, R2 are resistance devices that divide the DC voltage V0 being applied to the detection circuit 20, and have an extremely high resistance value, respectively (a resistance value of about hundreds of kΩ to several MΩ is selected). The DC voltage V0 that is applied to the positive input terminal is divided by the resistances R1, R2 and is converted into the voltage Svo, and then it is output to a calculation circuit 42. Accordingly, the DC-DC converter circuit 10 can convert the output voltage V0 into a low voltage (for example, 0 to 5V) that can be detected by the calculation circuit 42.

The current flowing through the positive output terminal from the DC-DC converter circuit 10 flows to a serial connection of the resistances R1, R2 of the detection circuit 20 and to the DC-AC converter circuit 30 and then flows to the negative output terminal of the DC-DC converter circuit 10. Since the serial connection of the resistances R1, R2 has an extremely high resistance value, the current flowing in the serial connection is extremely low. That is, compared to the current flowing through the positive output terminal of the DC-DC converter circuit 10, the current flowing in the resistances R1, R2 is extremely low. Therefore, the current flowing to the negative input terminal of the detection circuit 20 is the substantially same as the current flowing through the positive output terminal of the DC-DC converter circuit 10.

The calculation circuit 42 can detect the current flowing to the negative input terminal of the detection circuit 20 from the negative output terminal of the detection circuit 20, as the voltage Sio by the resistance R3, thereby measuring the current flowing through the positive output terminal of the DC-DC converter circuit 10.

<DC-AC Inverter Circuit 30>
The DC-AC inverter circuit (AC voltage generation circuit) 30 is a full-bridge inverter. The positive input terminal of the DC-AC inverter circuit 30 is connected to the positive output terminal of the detection circuit 20. The negative input terminal of the DC-AC inverter circuit 30 is connected to the negative output terminal of the detection circuit 20. One output terminal of the DC-AC inverter circuit 30 is connected to one end of the coil L2. The other output terminal of the DC-AC inverter circuit 30 is connected to one end of the electric discharge lamp La and one end of the capacitor C3. Also, the other end of the electric discharge lamp La, the other end of the capacitor C3 and the other end of the coil L2 are connected each another.

The DC-AC inverter circuit 30 converts the input DC voltage V0 into an AC voltage and supplies the lamp current ILa by the AC voltage to the electric discharge lamp La.

The DC-AC inverter circuit 30 has switch devices Q2 to Q5 that are n-type MOSFETs. The switch devices Q2, Q3 configure one switching leg of the DC-AC inverter circuit 30. The switch devices Q4, Q5 configure the other switching leg of the DC-AC inverter circuit 30.

In the one switching leg of the DC-AC inverter circuit 30, a drain terminal of the switching device Q2 is connected to the positive input terminal of the DC-AC inverter circuit 30. A source terminal of the switching device Q2 is connected to a drain terminal of the switching device Q3 and to one output terminal of the DC-AC inverter circuit 30, thereby generating a voltage Vac1. A source terminal of the switching device Q3 is connected to the negative input terminal of the DC-AC inverter circuit 30.

In the other switching leg of the DC-AC inverter circuit 30, a drain terminal of the switching device Q4 is connected to the positive input terminal of the DC-AC inverter circuit 30. A source terminal of the switching device Q4 is connected to a drain terminal of the switching device Q5 and to the other output terminal of the DC-AC inverter circuit 30, thereby generating a voltage Vac2. A source terminal of the switching device Q5 is connected to the negative input terminal of the DC-AC inverter circuit 30.

The switch devices Q2 to Q5 are on/off-controlled by four polarity reversion control signals that are respectively input from an AC driving control circuit 43. When the switch devices Q2, Q5 become on and the switch devices Q3, Q4 become off, the voltage Vac1 becomes Vo[V] and the voltage Vac2 becomes 0[V]. When the switch devices Q3, Q4 become on and the switch devices Q2, Q5 become off, the voltage Vac1 becomes 0[V] and the voltage Vac2 becomes Vo[V]. As this repeats, an AC voltage (voltage Vac2-voltage Vac1) is generated, and the generated AC voltage is supplied to the electric discharge lamp La as a driving voltage, via a resonance circuit that is configured by the coil L2 and the capacitor L3.

In the electric discharge lamp La, the lamp current ILa that is alternating current flows. The electric discharge lamp La is a light source that emits light in correspondence to the supplied lamp current ILa.

<Control Circuit Unit 40>

The control circuit unit 40 has the calculation circuit 42 configured by a DSP (Digital Signal Processor), for example, the DC driving control circuit 41 and the AC driving control circuit 43.

The DC driving control circuit 41 generates the PWM signal being a control signal. The PWM signal is pulse width-modulated, based on the duty ratio corresponding to the plurality of color segments. In this illustrative embodiment, the control information of the control signal is the duty ratio of the PWM signal.

The DC driving control circuit 41 inputs the generated PWM control signal to the gate terminal of the switching device Q1, as a switching pulse for on/off-controlling the switching device Q1 in the DC-DC converter circuit 10.

The calculation circuit 42 stores a plurality of modulation factors corresponding to the plurality of color segments and has a plurality of calculation unit corresponding to the plurality of color segments. The calculation circuit 42 selects the plurality of calculation unit in synchronization with each segment, calculates the duty ratio information corresponding to the modulation factor of the segment and outputs the same to the DC driving control circuit 41. The calculation circuit 42 detects the voltage Sio and performs feedback control so that the voltage Sio is constant. By the feedback control, the current that is supplied by the DC-DC converter circuit 10 becomes constant, so that the lamp current ILa becomes constant. The calculation circuit 42 will be specifically described later.

The AC driving control circuit 43 is controlled by the calculation circuit 42. The AC driving control circuit 43 outputs the polarity reversion control signals to the gate terminals of the switch devices Q2 to Q5 of the DC-AC inverter circuit 30, thereby on/off-controlling the switch devices Q2 to Q5. Accordingly, the AC driving control circuit 43 converts the DC voltage V0, which is applied to the DC-AC inverter circuit 30, into the AC voltage and supplies the same to the electric discharge lamp La.

The calculation circuit 42 that is provided to the control circuit unit 40 of the light source control device 1 is described with reference to FIGS. 1 and 2. The calculation circuit 42 has an input unit 50, a target current setting unit 51, a processing selection unit 52, a duty calculation unit 53 and a duty limiter unit 54. The input unit 50 has a segment determination part 500, an output voltage AD conversion part 501 and an output current AD conversion part (current conversion part) 502.

The segment determination part 500 determines present segment information, based on an external synchronizing signal Sext that synchronizes with each segment. That is, the segment determination part 500 determines which segment the light emitted from the light source penetrates. A detailed operation of the segment determination part 500 will be described with reference to FIG. 5(a).

The output voltage AD conversion part 501 is an analog-digital converter that converts the input voltage Svo into a digital value. The voltage Svo is obtained by dividing the DC voltage V0 that is applied to the detection circuit 20 and the DC-AC inverter circuit 30 by the DC-DC converter circuit 10.

That is, the output voltage AD conversion part 501 outputs a digital value that indicates (is proportional to) the DC voltage V0.

The output current AD conversion part 502 is an analog-digital converter that converts the input voltage Sio into a digital value. The voltage Sio is proportional to the output current of the DC-DC converter circuit 10. That is, the output current AD conversion part 502 outputs a digital value that indicates (is proportional to) the output current of the DC-DC converter circuit 10.

The target current setting unit 51 has a modulation factor table 510, an average current calculation part 511 and a target current calculation part 512. The target current setting unit 51 sets a target value of the output current, based on the digital value indicating the output current and the segment information.

A target current value of each segment that is actually set is obtained by calculating a reference current value at the time that the modulation factor is 100%, from an output average current value (target value) and modulation factors set for the respective segments of one period of a color wheel 70 (FIG. 3) (which will be described later), and multiplying the reference current value by the modulation factor set for each segment.

For example, when the target current value is 2 [A] and the modulation factors of the respective segments are 100[%], 120[%], 100[%], 150[%], 200[%] and 250[%], respectively, the reference current value and the target current value of each segment are calculated as follows:

reference current value=2÷(1+1.2+1+1.5+2+2.5)× 6=1.3[A];

target current value of segment 0=1.3×1.0=1.3[A];

target current value of segment 1=1.3×1.2=1.56[A];

target current value of segment 2=1.3×1.0=1.3[A];

target current value of segment 3=1.3×1.5=1.95[A];

target current value of segment 4=1.3×2.0=2.6[A]; and target current value of segment 5=1.3×2.5=3.25[A].

The above equations are applied to a case where angles of the respective segments are the same. When the angles of the respective segments are different, like the first illustrative embodiment, a difference of the angles of the segments is reflected on the calculation of the reference current value.

The modulation factor table 510 has a table in which the modulation factors of the respective segments are stored, and outputs the modulation factor of the segment, based on the input segment information. Here, the modulation factor of the segment is a coefficient that is arbitrarily set for each segment so as to adjust a white balance of the projector. The modulation factor is set within a range of 100 to 250%, for example.

The average current calculation part 511 averages the digital values indicating the output current and outputs the averaged digital value.

The target current calculation part 512 outputs a digital value indicating the target current of the segment, based on a digital value indicating the output voltage of the DC-DC converter circuit 10, a digital value indicating the output current of the DC-DC converter circuit 10 and the modulation factor of the segment.

The processing selection unit 52 selects any one of a duty calculation part 531a for a segment 0 to a duty calculation part 531f for a segment 5, as a calculation unit corresponding to the segment, based on the segment information. For example, when a determination result (segment information) of the segment determination part 500 is a segment 0, the processing selection unit 52 selects the duty calculation part 531a for a segment 0.

The duty calculation unit 53 calculates duty ratio information of the control signal that is output to the DC-DC converter circuit 10 so that the digital value indicating the output current approximates to the digital value indicating the target current. The duty calculation unit 53 has the duty calculation part 531a for a segment 0 to the duty calculation part 531f for a segment 5.

The duty calculation part 531a for a segment 0 to the duty calculation part 531f for a segment 5 calculate and output the duty ratio information (control information) corresponding to the modulation factors of the segments in synchronization with the respective segments.

When the input duty ratio information deviates from a predetermined range, the duty limiter unit 54 limits the duty ratio to thus prevent the system from abnormally operating. For example, when a range of the duty ratio information that can be designated for the DC driving control circuit 41 is 0% to 95%, the duty limiter unit 54 limits the duty ratio within the range. The duty limiter unit 54 may also limit the duty ratio information, taking into consideration a range within which the DC-DC converter circuit 10 can linearly control the output voltage V0, a voltage (withstanding voltage) that can be applied to the DC-AC inverter circuit 30, and a voltage (withstanding voltage) that can be applied to the electric discharge lamp La.

Figure 3:
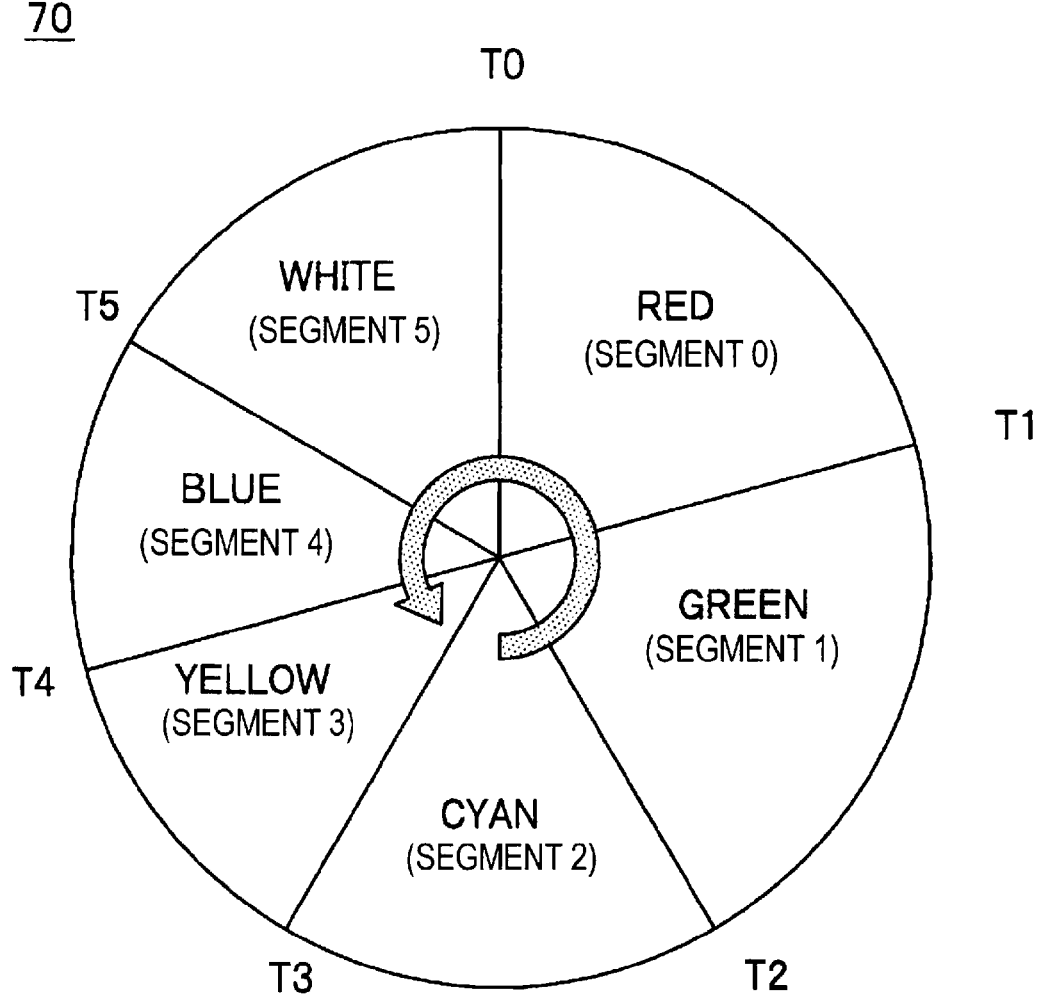
FIG. 3 is a view illustrating a schematic configuration of a color wheel in the first illustrative embodiment.

The color wheel 70 is described with reference to FIG. 3.

The color wheel 70 is circular and has a rotary shaft at a central portion thereof. The color wheel 70 has six fan-shaped segments about the rotary shaft.

A segment 0 has a red color filter. A segment 1 has a green color filter. A segment 2 has a cyan color filter. A segment 3 has a yellow color filter. A segment 4 has a blue color filter. A segment 5 has a white, i.e., clear color filter.

The color wheel 70 is mounted so that the light emitted from the electric discharge lamp La penetrates one of the color filters of the segments 0 to 5. Also, the color wheel 70 rotates about the rotary shaft at a predetermined rotating speed and is configured so that the light penetrates the color filters of all the segments.

Here, the time at which the light emitted from the electric discharge lamp La starts to penetrate the color filter of the segment 0 is defined as time T0. The time at which the light emitted from the electric discharge lamp La starts to penetrate the color filter of the segment 1 is defined as time T1. The time at which the light emitted from the electric discharge lamp La starts to penetrate the color filter of the segment 2 is defined as time T2. The time at which the light emitted from the electric discharge lamp La starts to penetrate the color filter of the segment 3 is defined as time T3. The time at which the light emitted from the electric discharge lamp La starts to penetrate the color filter of the segment 4 is defined as time T4. The time at which the light emitted from the electric discharge lamp La starts to penetrate the color filter of the segment 5 is defined as time T5.

An angle occupied by the segment 0 of the color wheel 70 is the largest, compared to those of the segments 2 and 4. Accordingly, a period from time T0 to time T1 is the longest, compared to a period from time T2 to time T3 and a period from time T4 to time T5. Hence, the calculation circuit 42 can analyze the external synchronizing signal Sext to thus determine the period of the segment 0.

(Operations of Light Source Control Device 1 of First Illustrative Embodiment)

Figure 2:
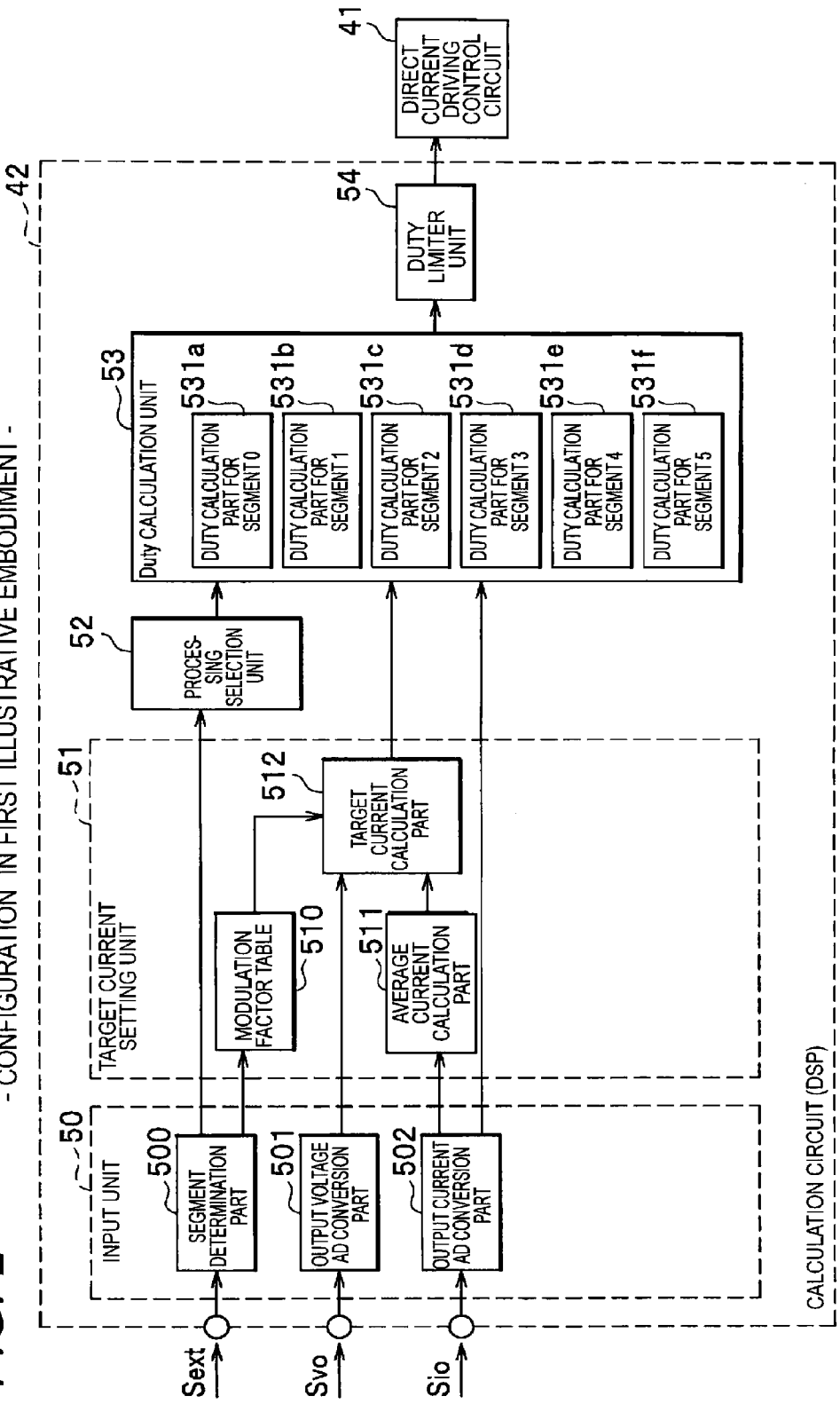
FIG. 2 is a view illustrating a configuration of a calculation circuit in the first illustrative embodiment.
Figure 4:
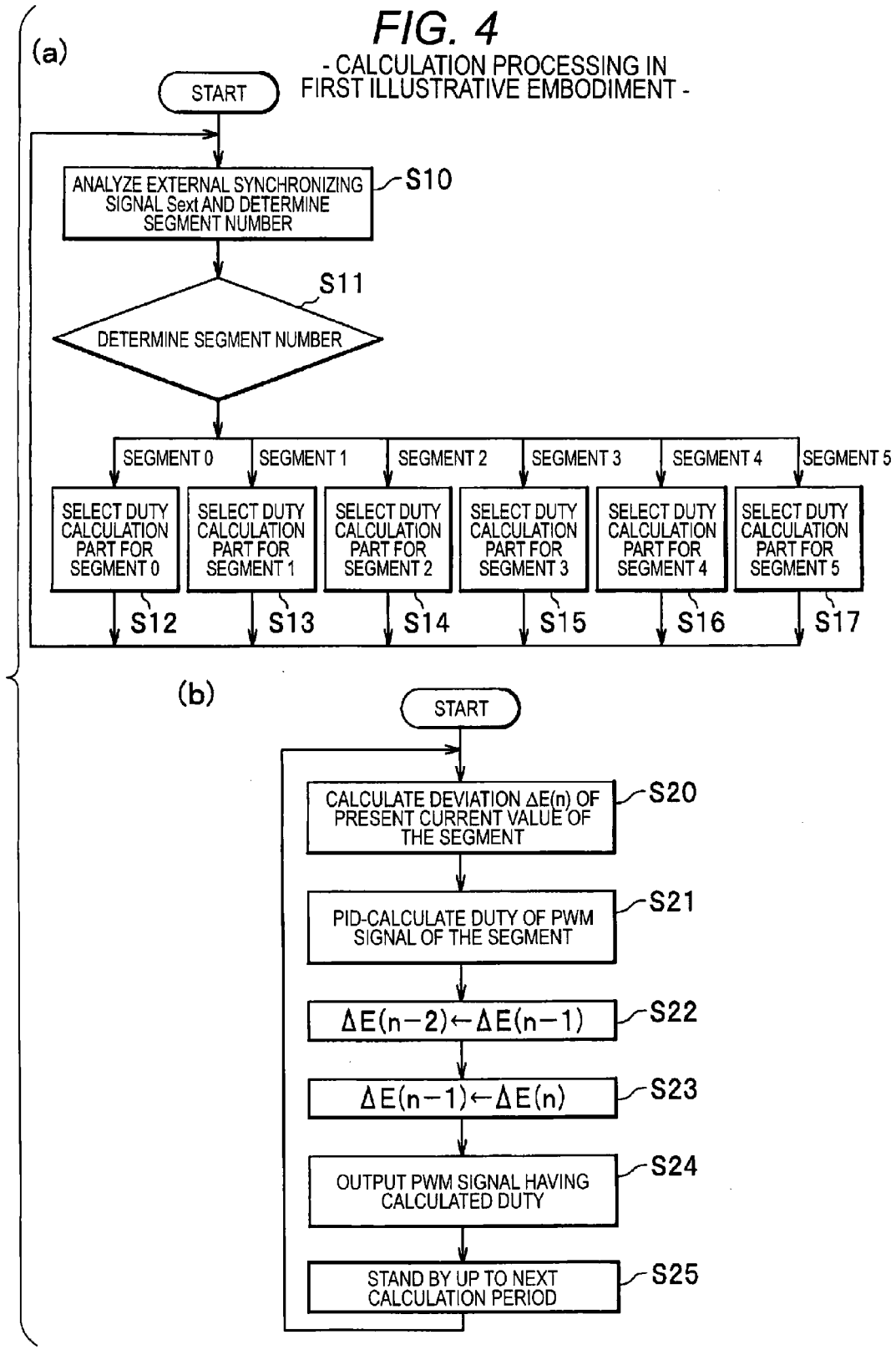

The processing that is executed by the calculation circuit 42 is described based on FIG. 4 while appropriately referring to FIG. 2.

FIG. 4(a) is a flow chart illustrating processing that the calculation circuit 42 receives the external synchronizing signal Sext and selects the duty calculation part corresponding to the segment.

When the processing starts, the segment determination part 500 of the calculation unit 42 analyzes the external synchronizing signal Sext and obtains a segment number, in step S10.

In step S11, the processing selection unit 52 determines the segment number. The processing selection unit 52 executes processing of step S12 when the segment number is 0, processing of step S13 when the segment number is 1, processing of step S14 when the segment number is 2, processing of step S15 when the segment number is 3, processing of step S16 when the segment number is 4 and processing of step S17 when the segment number is 5.

In step S12, the processing selection unit 52 selects the duty calculation part 531a for a segment 0. The processing selection unit 52 returns to the processing of step S10 after the processing of step S13.

In step S13, the processing selection unit 52 selects the duty calculation part 531b for a segment 1. The processing selection unit 52 returns to the processing of step S10 after the processing of step S13.

In step S14, the processing selection unit 52 selects the duty calculation part 531c for a segment 2. The processing selection unit 52 returns to the processing of step S10 after the processing of step S14.

In step S15, the processing selection unit 52 selects the duty calculation part 531d for a segment 3. The processing selection unit 52 returns to the processing of step S10 after the processing of step S15.

In step S16, the processing selection unit 52 selects the duty calculation part 531e for a segment 4. The processing selection unit 52 returns to the processing of step S10 after the processing of step S16.

In step S17, the processing selection unit 52 selects the duty calculation part 531f for a segment 5. The processing selection unit 52 returns to the processing of step S10 after the processing of step S17.

The calculation circuit 42 repeats the processing of steps S10 to S17 to thus operate the duty calculation part 531a for a segment 0 to the duty calculation part 531f for a segment 5 corresponding to the respective segments in synchronization with the respective segments. In the below, when the duty calculation part 531a for a segment 0 to the duty calculation part 531f for a segment 5 are not particularly discriminated, they are simply called as the 'duty calculation part 531.'

FIG. 4(b) is a flow chart illustrating processing of the duty calculation part 531a for a segment 0 to the duty calculation part 531f for a segment 5.

In steps S12 to S17, when the processing of the segment is selected by the processing selection unit 52, the processing shown in FIG. 4(b) starts. On the other hand, when processing of the other segment is selected, the above processing of the segment is stopped and it is ready for a next selection.

When the processing starts, the duty calculation part 531 calculates a deviation $\Delta E(n)$ of the present current value of the segment, in step S20. The deviation $\Delta E(n)$ is calculated by subtracting an output value of the output current AD conversion part 502 from an output value of the target current calculation part 512.

In step S21, the duty calculation part 531 performs PID (Proportional Integral Derivative control) calculation the duty ratio information of the PWM signal of the segment. An example of the PID calculation is as follows.

$$\text{Duty}(n) = K0 \times \Delta E(n) + K1 \times \Delta E(n-1) + K2 \times \Delta E(n-2) + \text{Duty}(n-1)$$

In the above equation, 'n' is an index that indicates a signal of a present period of the duty calculation, 'Duty' indicates the duty ratio information, and 'Duty (n)' indicates the duty ratio information that is newly calculated. 'Duty (n−1)' indicates the duty ratio information before one period of the duty calculation. 'ΔE (n−1)' indicates a deviation of the current value before one period of the duty calculation, and 'ΔE (n−2)' indicates a deviation of the current value before two periods of the duty calculation. 'K0', 'K1' and 'K2' indicate coefficients of the PID calculation, respectively.

In step S22, the duty calculation part 531 sets ΔE (n−1) for ΔE (n−2). That is, the duty calculation part 531 sets the deviation of the current before one period of the duty calculation for the deviation of the current before two periods of the duty calculation.

In step S23, the duty calculation part 531 sets ΔE (n) for ΔE (n−1). That is, the duty calculation part 531 sets the deviation of the present current of the duty calculation for the deviation of the current before one period of the duty calculation.

In step S24, the duty calculation part 531 outputs the duty ratio information obtained by the above calculation to the DC driving control circuit 41 via the duty limiter unit 54. The DC driving control circuit 41 outputs the PWM signal having the duty ratio, based on the duty ratio information.

In step S25, the duty calculation part 531 waits for a next calculation and then returns to the processing of step S20.

By the processing of steps S20 to S25, the duty calculation part 531 that is the calculation unit corresponding to the segment can calculate the duty ratio information of the PWM signal.

In the below, operations of the respective units of the light source control device 1 are described based on FIGS. 5(a) to 5(c) while appropriately referring to FIGS. 1 and 2.

A vertical axis of FIG. 5(a) indicates a voltage of the external synchronizing signal Sext. FIG. 5(b) illustrates an operation of the duty calculation unit 53. A vertical axis of FIG. 5(c) indicates current of the lamp current ILa. A horizontal axis of FIGS. 5(a) to 5(c) indicates common time t.

The external synchronizing signal Sext shown in FIG. 5(a) is a signal that becomes an H level at time T0 to T1, at time T2 to T3 and at time T4 to T5. The external synchronizing signal Sext is an output signal of a sensor (not shown) that detects a predetermined area of the segment 0, a predetermined area of the segment 2 and a predetermined area of the segment 4 of the color wheel 70 (refer to FIG. 3).

The angle occupied by the segment 0 (refer to FIG. 3) of the color wheel 70 is the largest, compared to those of the segments 2 and 4. Accordingly, a period from time T0 to time T1 during which the external synchronizing signal Sext is an H level is longer than a period from time T2 to time T3 or a period from time T4 to time T5. In the below, a pulse of an H level at time T0 to T1 is also referred to as an 'index pulse', in this illustrative embodiment.

The segment determination part 500 of the calculation circuit 42 detects a pulse having the longest period from the three pulses of an H level to thus detect the index pulse, thereby determining the segment 0. When the segment determination part 500 detects an edge of the external synchronizing signal Sext, the segment determination part increases the segment number by 1 (one), thereby determining the present segment number. In the meantime, the one period of the color wheel 70 is from time T0 of this time to time T0 of next time.

FIG. 5(b) indicates the duty calculation part 531 for each segment that is selected based on the external synchronizing signal Sext (based on the segment information).

At time T0 to T1, the duty calculation part 531a for a segment 0 operates. At time T1 to T2, the duty calculation par 531b for a segment 1 operates. At time T2 to T3, the duty calculation par 531c for a segment 2 operates. At time T3 to T4, the duty calculation par 531d for a segment 3 operates. At time T4 to T5, the duty calculation par 531e for a segment 4 operates. At time T5 to time T0 of a next time, the duty calculation par 531f for a segment 5 operates.

FIG. 5(c) illustrates the lamp current ILa that is controlled by the duty calculation part 531 for each segment. In the first illustrative embodiment, the light source control device 1 (refer to FIG. 1) controls the lamp current ILa so that positive/negative current is alternately output every the segment.

<Light Source Control Device of Comparative Example>

In the below, a configuration and an operation of a light source control device of a comparative example are described. A light source control device (not shown) of the comparative example has the same configuration as the light source control device 1 of the first illustrative embodiment, except that it has a different calculation circuit 82 (refer to FIG. 8) from the calculation circuit 42 (refer to FIG. 1) of the light source control device 1 of the first illustrative embodiment.

Figure 8:
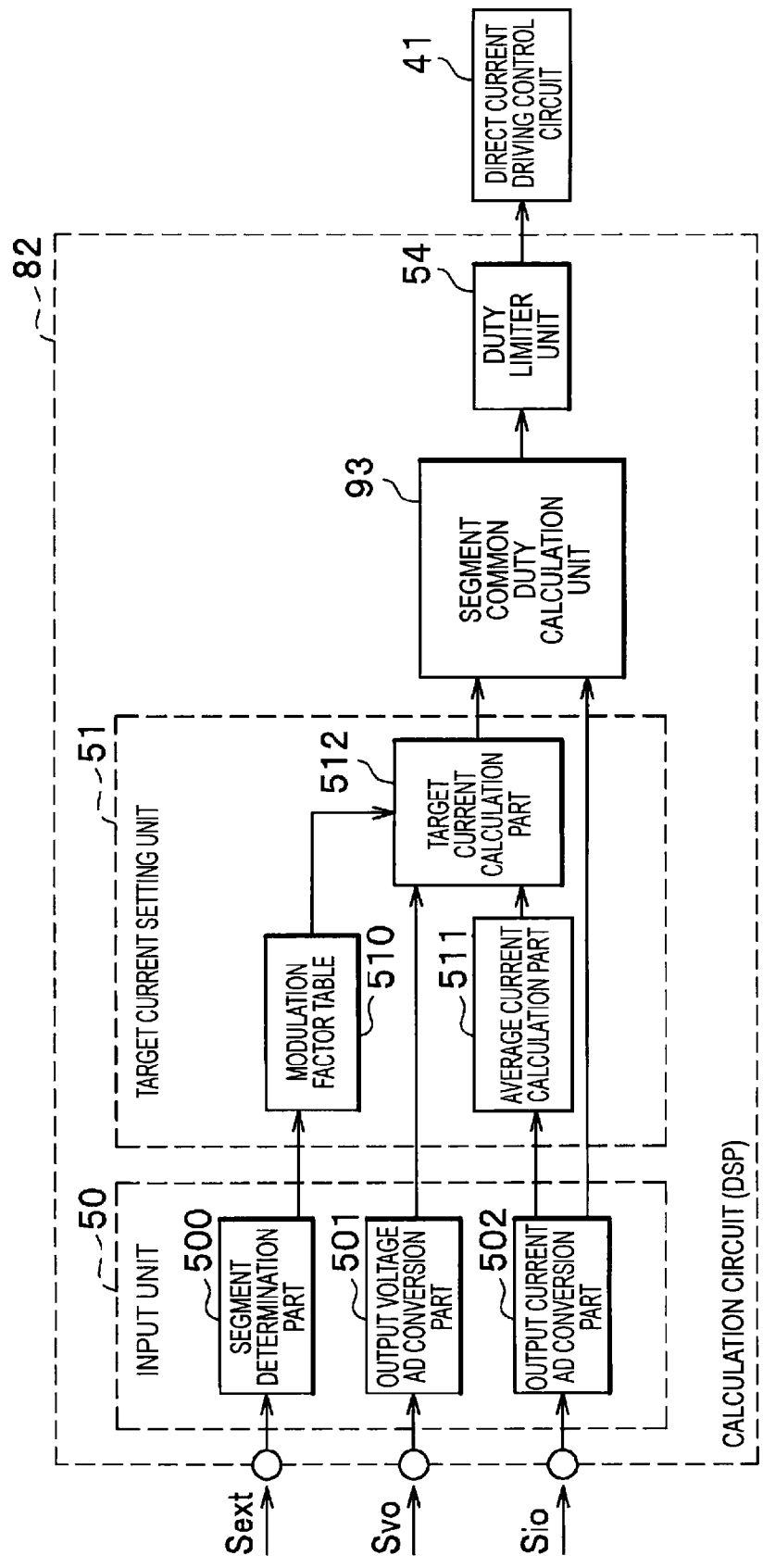
FIG. 8 illustrates a configuration of a calculation circuit in a comparative example.

FIG. 8 illustrates a configuration of the calculation circuit 82 of the comparative example.

The calculation circuit 82 of the comparative example has an input unit 50 similarly to the first illustrative embodiment, a target current setting unit 51 similarly to the first illustrative embodiment, a segment common duty calculation unit 93 different from the duty calculation unit 53 of the first illustrative embodiment and a duty limiter unit 54 similarly to the first illustrative embodiment.

The segment common duty calculation unit 93 calculates the duty ratio information of the control signal that is output to the DC-DC converter circuit 10, so as to perform the feedback control so that the digital value indicating the output current approximates to the digital value indicating the target current, without discriminating the respective segments, contrary to the duty calculation unit 53 (refer to FIG. 2) of the first illustrative embodiment.

In the below, operations of the respective units of the light source control device of the comparative example are described with reference to FIG. 9.

A vertical axis of FIG. 9(a) indicates a voltage of the external synchronizing signal Sext. FIG. 9(b) illustrates an operation of the segment common duty calculation unit 93. A vertical axis of FIG. 9(c) indicates current of the lamp current ILa. A horizontal axis of FIGS. 9(a) to 9(c) indicates common time t.

A waveform of the external synchronizing signal Sext shown in FIG. 9(a) is identical to that of the external synchronizing signal Sext shown in FIG. 5(a).

FIG. 9(b) illustrates that all the segments are controlled by the segment common duty calculation unit 93.

FIG. 9(c) illustrates the lamp current ILa that is controlled by the segment common duty calculation unit 93. Since the segment common duty calculation unit 93 controls all the segments, the lamp current ILa causes step responds with a predetermined time constant td after the segment is switched until the control result matches the target current value and is thus stable.

The lamp current ILa loses touch with the target current value while causing the step responds. Accordingly, an amount of luminescence of each segment loses touch with the target amount of luminescence. Likewise, the white balance of the projector, which is controlled by the amount of luminescence of each segment, loses touch with the target value. Accordingly, the projector may have a deteriorated quality of an image.

(Effects of First Illustrative Embodiment)

The first illustrative embodiment has a following effect.

The calculation circuit 42 stores the plurality of modulation factors corresponding to the plurality of color segments of the color wheel 70 in the modulation factor table 510 and has the duty calculation part 531 corresponding to the plurality of color segments. The calculation circuit 42 operates the duty calculation part 531 corresponding to each segment in synchronization with each segment, thereby calculating the duty ratio information of the PWM signal. Accordingly, even when switching the segment, the light source control device 1 of the projector can immediately make the lamp current ILa match the target current value without causing the step respond of the lamp current with the predetermined time constant td. Therefore, it is possible to suppress the quality of an image to be projected by the projector from being deteriorated.

(Configuration of Light Source Control Device 1 of Second Illustrative Embodiment)

The light source control device (not shown) of a second illustrative embodiment has the same configuration as that of the light source control device 1 of the first illustrative embodiment, except that it has a different calculation circuit 42a (refer to FIG. 6) from the calculation circuit 42 (refer to FIG. 1) of the light source control device 1 of the first illustrative embodiment.

Figure 6:
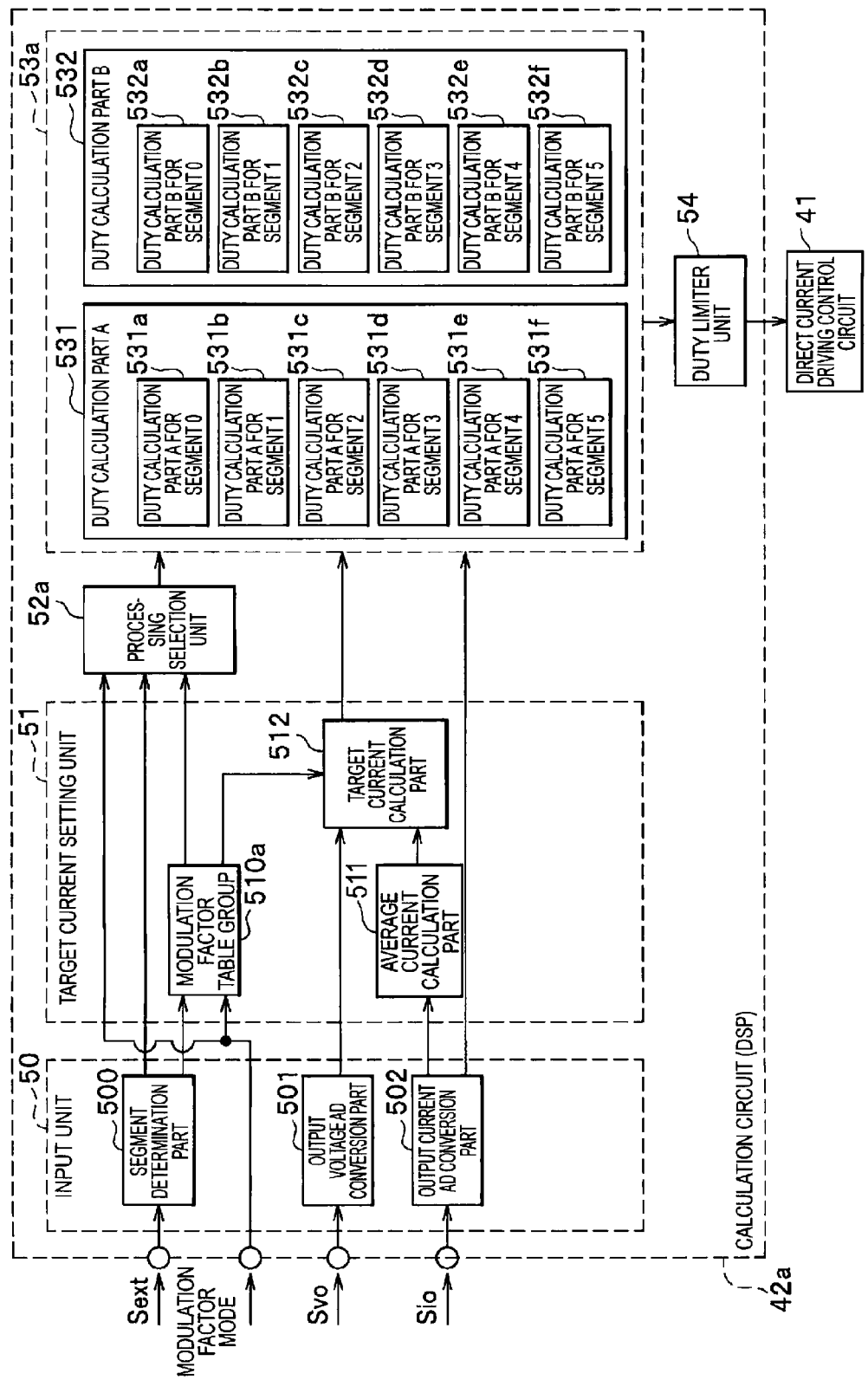
FIG. 6 is a view illustrating a schematic configuration of a calculation circuit in a second illustrative embodiment.

A configuration of the calculation circuit 42a is described with reference to FIG. 6.

The calculation circuit 42a of the second illustrative embodiment has the same configuration as the calculation circuit 42 (refer to FIG. 2) of the first illustrative embodiment, except that it has a modulation factor table group 510a, a processing selection unit 52a and a duty calculation unit 53a, which are different from those of the first illustrative embodiment, and that a modulation factor mode is input.

In the second illustrative embodiment, the modulation factor table group 510a has a modulation factor 'A' table and a modulation factor 'B' table, differently from the modulation factor table 510 (refer to FIG. 2) of the first illustrative embodiment. The modulation factor 'A' table is a table in which the modulation factors of the respective segments in a modulation factor 'A' mode are stored. The modulation factor 'B' table is a table in which the modulation factors of the respective segments in a modulation factor 'B' mode are stored.

The modulation factor 'A' mode is a first mode. The modulation factor 'A' table has a plurality of first modulation factors. The modulation factor 'B' mode is a second mode. The modulation factor 'B' table has a plurality of second modulation factors.

In the second illustrative embodiment, the projector controls the light source control device 1 so that it operates in modulation factor modes corresponding to a plurality of operation modes. The plurality of operation modes includes an 'image mode' in which a television image, a movie and the like are projected, a 'computer mode' in which a computer screen is projected, a 'low power mode' in which power consumption is reduced, and the like. The modulation factor table group 510a outputs the modulation factor of the segment to the processing selection unit 52a and the target current calculation part 512, based on the segment information and the modulation factor mode (operation mode).

In the second illustrative embodiment, the processing selection unit 52a selects a duty calculation part 'A' 531 or duty calculation part 'B' 532, based on the present modulation factor mode, differently from the processing selection unit 52 (refer to FIG. 2) of the first illustrative embodiment. The processing selection unit 52a also selects one of a duty calculation part 'A' 531a for a segment 0 to a duty calculation part 'A' 531f for a segment 5 or a duty calculation part 'B' 532a for a segment 0 to a duty calculation part 'B' 532f for a segment 5, based on the segment information.

The duty calculation part 'A' 531 is a plurality of first duty calculation parts relating to the first mode. The duty calculation part 'B' 532 is a plurality of second duty calculation parts relating to the second mode.

In the second illustrative embodiment, the duty calculation unit 53a has two sets of the duty calculation part 'A' 531 and the duty calculation part 'B' 532, differently from the duty calculation unit 53 (refer to FIG. 2) of the first illustrative embodiment. The duty calculation part 'A' 531 operates in correspondence to the modulation factor 'A' mode. The duty calculation part 'B' 532 operates in correspondence to the modulation factor 'B' mode.

The duty calculation part 'A' 531 also has the duty calculation part 'A' 531a for a segment 0 to the duty calculation part 'A' 531f for a segment 5. The duty calculation part 'B' 532 also has the duty calculation part 'B' 532a for a segment 0 to the duty calculation part 'B' 532f for a segment 5.

(Operations of Light Source Control Device 1 of Second Illustrative Embodiment)

The operations of the respective units of the light source control device 1 are described with reference to FIG. 7.

A vertical axis of FIG. 7(a) indicates a voltage of the external synchronizing signal Sext. FIG. 7(b) illustrates an operation of the duty calculation 'A' 531 or duty calculation part 'B' 532. A vertical axis of FIG. 7(c) indicates current of the lamp current ILa. A horizontal axis of FIGS. 7(a) to 7(c) indicates common time t.

The waveform of the external synchronizing signal Sext shown in FIG. 7(a) is the same as that of the external synchronizing signal Sext shown in FIG. 5(a).

FIG. 7(b) illustrates that the duty calculation part 'A' 531 and the modulation factor 'A' table are selected in a first period of the color wheel 70. At this time, the projector is in the modulation factor 'A' mode. For the respective segments, the duty calculation part 'A' 531a for a segment 0 to the duty calculation part 'A' 531f for a segment 5 are sequentially selected and operated.

When the projector receives a command to change the operation mode from an operation means (not shown), the projector instructs the calculation circuit 42a of the light source control device 1 of the projector to switch the modulation factor mode.

In the modulation factor 'A' mode that is the first mode, the processing selection unit 52a sets the modulation factor 'A' table, which is the first modulation factor, based on the segment information, and selects and operates any one of the duty calculation part 'A' 531a for a segment 0 to the duty calculation part 'A' 531f for a segment 5.

At time T0 of a second period of the color wheel 70, the duty calculation part 'B' 532 and the modulation factor 'B' table are selected. At this time, the operation mode of the projector is switched and the light source control device 1 operates in the modulation factor 'B' mode. For the respective segments, the duty calculation part 'B' 532a for a segment 0 to the duty calculation part 'B' 532f for a segment 5 are sequentially selected and operated. Then, the duty calculation part 'B' 532 and the modulation factor 'B' table are selected.

In the modulation factor 'B' mode that is the second mode, the processing selection unit 52a sets the modulation factor 'B' table, which is the second modulation factor, based on the segment information, and selects and operates any one of the duty calculation part 'B' 532a for a segment 0 to the duty calculation part 'B' 532f for a segment 5.

When the projector receives a command to change the operation mode, the light source control device 1 of the projector switches the operation mode (modulation factor mode) at start time of a next segment 0.

(Effects of Second Illustrative Embodiment)

The second illustrative embodiment has following effects.

Since the calculation circuit 42a has the modulation factor table group 510a having the plurality of modulation factors, the duty calculation part 'A' 531, which is the plurality of first duty calculation parts corresponding to the first mode, and the duty calculation part 'B' 532, which is the plurality of second duty calculation parts, it is possible to instantaneously switch the plurality of modulation factor modes (operation modes).

As the modulation factor mode changes and at time T0 synchronous with the segment 0, the circulation circuit 42a switches the modulation factor table into one of the modulation factor 'A' table and the modulation factor 'B' table in correspondence to the modulation factor mode and the duty calculation part into one of the duty calculation part 'A' 531 and the duty calculation part 'B' 532 in correspondence to the modulation factor mode. Also, in the modulation factor 'A' mode, the circulation circuit sequentially selects and operates the duty calculation part 'A' 531a for a segment 0 to the duty calculation part 'A' 531f for a segment 5, which are provided to the duty calculation part 'A' 531, in synchronization with the respective segments. Accordingly, it is possible to immediately make the lamp current ILa match the target current value without causing the step respond of the lamp current.

When the projector receives the command to change the operation mode, the light source control device 1 switches the operation mode (modulation factor mode) at start time of a next segment 0. Since the light source control device 1 switches the operation mode in one period unit (time T0) of the color wheel 70, it is possible to suppress the color noise caused as the operation mode is switched.

(Modified Embodiments)

This disclosure is not limited to the above illustrative embodiments and can be modified without departing from the scope of this disclosure. Following modified embodiments (a) to (j) may be exemplified.

(a) In the first illustrative embodiment, the light source control device 1 acquires the deviation ΔE of the lamp current ILa and then feedback-controls the deviation ΔE. However, this disclosure is not limited thereto. For example, the light source control device 1 may be configured to feedback-control a deviation of the voltage value or deviation of the power value by changing the constitutional elements or signal paths of the input unit 50 or target current setting unit 51.

(b) In the first illustrative embodiment, the light source control device 1 sets the duty ratio of the control target with a ratio of the on period of the PWM signal. However, this disclosure is not limited thereto. For example, the light source control device 1 may be configured to set the duty ratio of the control target with a ratio of the off period of the PWM signal.

(c) In the first illustrative embodiment, the light source control device 1 uses the PWM signal as the control signal and uses the on-duty ratio as the control information. However, this disclosure is not limited thereto. For example, the control signal may be the other signal type such as PFM (Pulse Frequency Modulation) signal, PPM (Pulse Position Modulation) signal, PDM (Pulse Density Modulation) signal and the like. Also, the control information may be control information that is included in the respective signal types.

(d) The DC-DC converter circuit 10 of the first illustrative embodiment is not limited to the step-down chopper type power supply. Likewise, the DC-AC inverter circuit 30 of the first illustrative embodiment is not limited to the full-bridge inverter.

(e) In the first illustrative embodiment, the light source control device 1 emits the light from the electric discharge lamp La and enables the light to penetrate the color filters of the respective segments of the color wheel 70. However, this disclosure is not limited thereto. For example, the light source control device 1 may be configured to emit the light from a light source (for example, light emitting diode, laser and the like), for which the amount of luminescence can be promptly controlled in correspondence to the color filters of the respective segments, and to enable the light to penetrate the color filters of the respective segments.

(f) In the first illustrative embodiment, the light source control device 1 performs the feedback control by the PID calculation. However, this disclosure is not limited thereto. For example, the light source control device 1 may perform the feedback control with any calculation method such as PI (Proportional Integral control) calculation, PD (Proportional Derivative control) calculation, IPD (Proportional/Derivative Preceded PID control) calculation and the like as long as it can perform the feedback control to a target value.

(g) In the first illustrative embodiment, the light source control device 1 determines the segment 0 by the index pulse of the time T0 to T1 and then sequentially determines the segment information. However, a pulse of a period other than the above period may be used as the index pulse as long as the segment can be determined.

(h) In the first illustrative embodiment, the light source control device 1 determines the segment 0 by the index pulse of the time T0 to T1 and then sequentially determines the segment information. However, this disclosure is not limited thereto. For example, the light source control device 1 may read out bit information indicating each segment with a rotary encoder. Also, the light source control device 1 may determine the segment 0 by using a PG pulse indicating a predetermined rotating position, in addition to the external synchronous signal Sext, and then increase the segment number for each edge of the external synchronous signal Sext and determine the segment.

Figure 5:
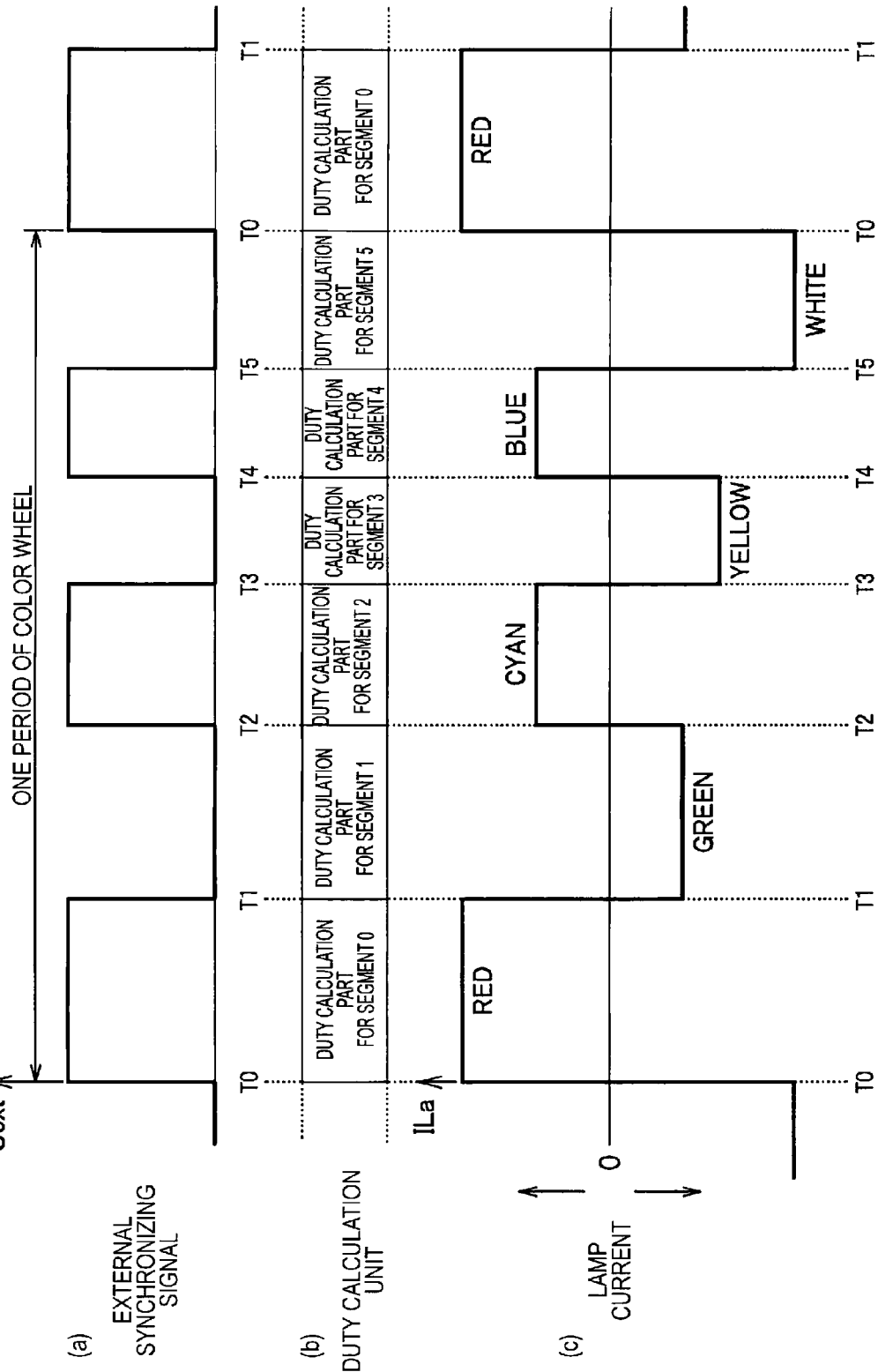
Figure 7:
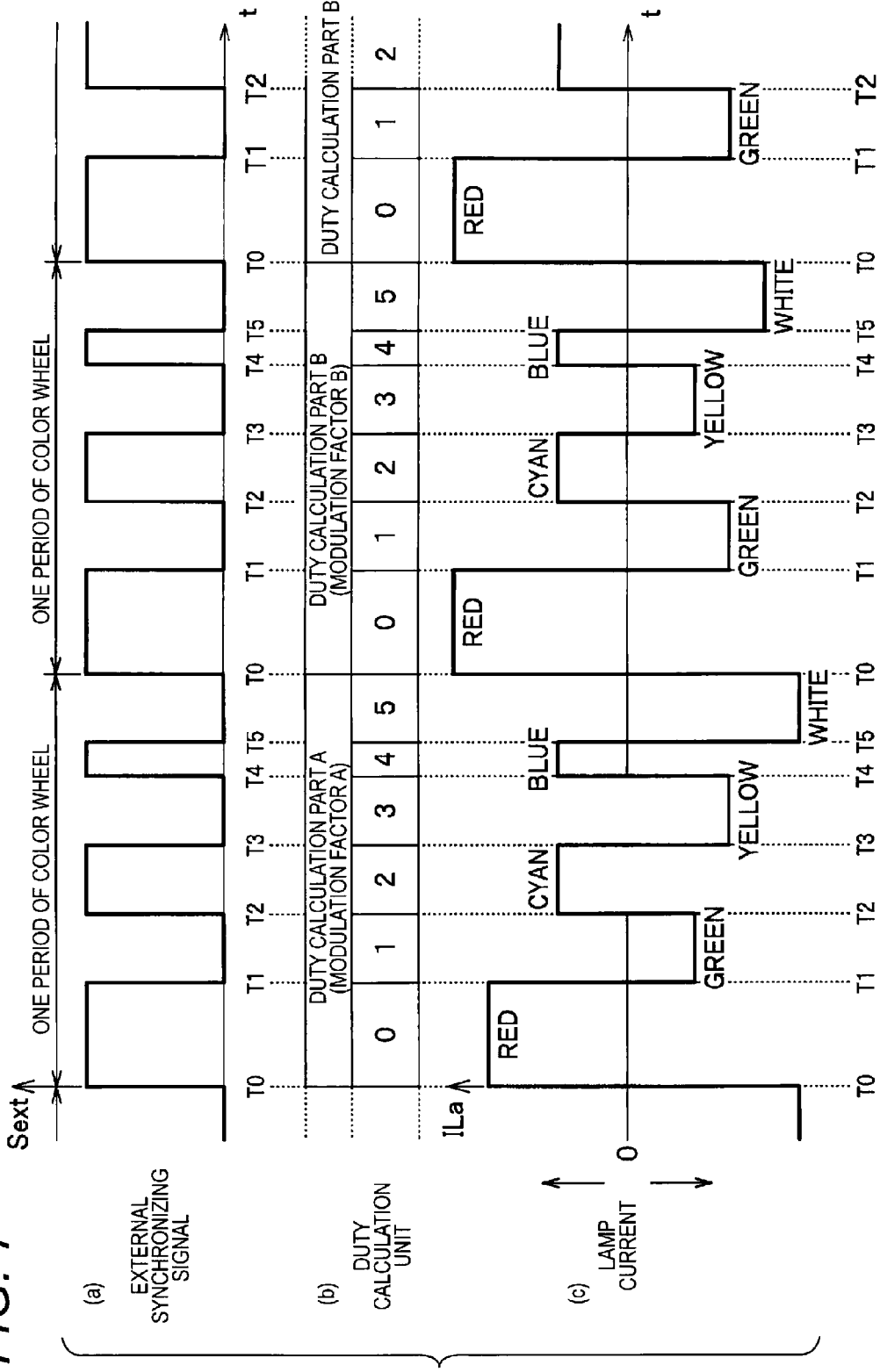

(i) Also, if the segment can be determined, the waveform of the external synchronizing signal Sext is not limited to the waveform shown in FIG. 5 or 7. For example, the waveform may be a pulse of the same polarity synchronizing with the timing at which the segment is switched, for example.

(j) The projector having the light source control device 1 of the first illustrative embodiment enables the light to penetrate the color filters of the color wheel having the plurality of color segments and converts the same into the lights of the plurality of colors. However, this disclosure is not limited thereto. For example, the projector may reflect the light at a reflection type color wheel having a plurality of color segments and convert the same into the lights of the plurality of colors.

What is claimed is:

1. A light source control device controlling a light source that emits light corresponding to supplied current and a color wheel having a plurality of color segments that converts the light emitted from the light source, the light source control device comprising:

a current generation circuit, which supplies current to the light source, based on a control signal for controlling an amount of the light of the light source; and a control circuit unit, which stores a plurality of modulation factors corresponding to the plurality of color segments and has a plurality of calculation units corresponding to the plurality of color segments, and which operates the calculation unit corresponding to the segment in synchronization with each segment to calculate control information of the control signal.

2. The light source control device according to claim 1, wherein the control signal is a pulse width modulation (PWM) signal, wherein the control information is a duty ratio of the PWM signal, wherein the light source is an electric discharge lamp that emits the light corresponding to supplied alternating current (AC) current, wherein the current generation circuit comprises:

a direct current (DC) voltage generation circuit that outputs a DC voltage in response to the duty ratio of the input PWM signal;

a detection circuit that detects an output current value of the DC voltage generation circuit; and an AC voltage generation circuit that converts the DC voltage into an AC voltage and supplies the AC current resulting from the AC voltage to the electric discharge lamp that is the light source, wherein the control circuit unit operates the calculation unit corresponding to the segment in synchronization with each segment, and wherein the calculation unit corresponding to the segment calculates the duty ratio so that the output current value approximates to a target current value corresponding to the segment, and thus outputs the PWM signal having the duty ratio.

3. The light source control device according to claim 2, wherein the control circuit unit further comprises:

a DC driving control circuit that generates the PWM signal, which is pulse width-modulated based on the duty ratio and outputs the same to the DC voltage generation circuit; and a calculation circuit that stores the plurality of modulation factors corresponding to the plurality of color segments and has the plurality of calculation unit corresponding to the plurality of color segments.

4. The light source control device according to claim 3, wherein the calculation circuit further comprises:

a current conversion unit that converts a detection value of the output current, which is output from the DC voltage generation circuit, into a digital value;

a segment determination unit that determines segment information based on an external synchronizing signal synchronizing with each segment;

a target current setting unit that sets the modulation factors, based on the segment information, and sets the target current value corresponding to the segment information based on the modulation factors and the digital value;

a plurality of duty calculation units that calculates the duty ratio so that the digital value approximates to the target current value, in synchronization with each segment; and a processing selection unit that selects and operates the duty calculation unit corresponding to the segment information.

5. The light source control device according to claim 4, wherein the calculation circuit further comprises:

a plurality of first modulation factors and a plurality of first duty calculation units relating to a first mode, and a plurality of second modulation factors and a plurality of second duty calculation units relating to a second mode, wherein, in the first mode, the processing selection unit sets the first modulation factors based on the segment information, and selects and operates any one of the first duty calculation units corresponding to the segment information, and wherein, in the second mode, the processing selection unit sets the second modulation factors based on the segment information, and selects and operates any one of the second duty calculation units corresponding to the segment information.

6. A light source control method of a light source control device that controls: a light source that emits light corresponding to supplied current; a control circuit unit that has a color wheel having a plurality of color segments that converts the light emitted from the light source, a plurality of modulation factors corresponding to the plurality of color segments and a plurality of calculation units corresponding to the plurality of color segments, and a current generation circuit that supplies current to the light source, based on a control signal for controlling an amount of the light of the light source, the method comprising:

operating the calculation unit corresponding to the segment in synchronization with each segment to calculate control information of the control signal, and supplying current based on the control signal to the light source.

* * * * *